US006779775B2

(12) United States Patent
Apel

(10) Patent No.: US 6,779,775 B2
(45) Date of Patent: Aug. 24, 2004

(54) AIR FLAP SYSTEM WITH A MAGNETIC POSITIONING SPRING

(75) Inventor: Peter Apel, Suedkirchen (DE)

(73) Assignee: AB Elektronik GmbH, Werne (DE)

( * ) Notice: Subject to any disclaimer, the term of this patent is extended or adjusted under 35 U.S.C. 154(b) by 44 days.

(21) Appl. No.: 10/357,067

(22) Filed: Jan. 31, 2003

(65) Prior Publication Data

US 2004/0021106 A1 Feb. 5, 2004

(30) Foreign Application Priority Data

Jul. 31, 2002 (DE) ........................................ 102 35 049

(51) Int. Cl.[7] ................................................ F16K 1/22
(52) U.S. Cl. .......................... 251/65; 251/305; 123/319
(58) Field of Search .......................... 251/305, 65, 308; 123/319

(56) References Cited

U.S. PATENT DOCUMENTS 5,009,388 A * 4/1991 Pei-gi et al. .................. 251/65
5,624,100 A * 4/1997 Bolte et al. .................... 251/65
6,173,939 B1 * 1/2001 Dottavio et al. ............ 251/305
6,244,565 B1 * 6/2001 McDonnell et al. ........ 251/305
6,267,352 B1 * 7/2001 Semeyn et al. ............. 251/305

FOREIGN PATENT DOCUMENTS

| | | |
|---|---|---|
| DE | 36 31 283 | 3/1988 |
| DE | 41 24 973 | 1/1993 |
| EP | 0 992 662 | 4/2000 |
| WO | WO 95/35440 | 6/1995 |

* cited by examiner

*Primary Examiner*—John Bastianelli
(74) *Attorney, Agent, or Firm*—Milde & Hoffberg, LLP

(57) ABSTRACT

The invention relates to an air flap supply device for the controlled supply of burner air to a combustion engine, wherein a damper flap element, within a damper flap housing element, and connected to a damper flap shaft element can be adjusted by a positioning movement using at least one retraction unit designed as a magnetically homo-polar counter movement unit, wherein, at least two magnet elements with the same magnetic polarity (N, S) are located opposite to one another, and moveable in relation to each other, preferably in a rotary fashion to one another.

21 Claims, 6 Drawing Sheets

AIR FLAP SYSTEM WITH A MAGNETIC POSITIONING SPRING

FIELD OF THE INVENTION

The invention relates to an air flap supply device for the controlled supply of burner air to a combustion engine, wherein the damper flap is adjusted using at least one retraction unit.

BACKGROUND OF THE INVENTION

A device of the type mentioned above is known from WO 95 35 440 A2. The drive by wire system disclosed therein consists of a damper flap unit and a positioning unit that are arranged together in one housing. The damper flap unit includes at least one damper flap, positioned within the housing, and connected to a damper flap shaft. The positioning unit consists of a motor unit, a retraction spring and an opener spring, that are connected at the damper flap shaft such that a vehicle can be moved during normal operation and in the limp home operation in case of a malfunction of the motor unit.

DE 36 31 283 A1 discloses a device for the controlled, metered addition of burner air to a combustion engine that allows for an emergency driving operation and prevents a freezing of the damper flap in the idle position in case of a malfunction of the electrical positioner connected to the damper flap. The damper flap is connected to a positioning shaft. Also connected to the positioning shaft are a retraction spring and a counter spring. While the retraction spring positions the damper flap in an end position, the counter spring ensures a damper flap is opened at an idle angle enabling an emergency driving operation.

A device with a similar design as the one mentioned above, and that also employs two springs, is known from EP 0 992 662 A2.

Common to these three solutions is the utilization of helical springs, which are susceptible to breakage. In addition, helical springs provide a spring force that increases exponentially.

DE 41 40 353 A1 discloses a device for adjusting the airflow through a flow-through element, with a damper flap, for a fuel supply system of a motor vehicle with an internal combustion engine. A spring is located in a housing. At the outset, the spring has a helical shape, and describes an angle of 300°. The first, helical section of the spring changes to a second, U-shaped section. The spring exhibits a second end at the end of the U-shaped section. The spring counters the rotary motion of the electric motor. Its design ensures that the damper slide valve retains a small opening for emergency operation in case of a malfunction of the electric motor.

Finally, DE 41 24 973 A1 describes a load adjustment device for a drive motor, where a damper flap may be held at an adjustable stop outside of the regular flap position range, when desired. However, the spring to be employed is a tension spring, a compression spring or a torsion spring.

SUMMARY OF THE INVENTION

The present invention provides an air flap supply device with a damper flap element connected to a damper flap shaft element, in the damper flap opening, and adjustable therein by a positioning movement (G) using at least one retraction unit, comprising a magnetically homo-polar counter movement unit.

The advantages achieved with the invention arise especially from the use of magnetic spring elements, used in place of a spring element. The magnetic spring element is break-proof and its spring travel path can be adjusted such that it is essentially linear during its motion. This results in a better and more accurate positioning capability.

A first counter movement unit can be designed such that at least two magnet elements, with the same magnetic polarity are arranged opposite to one another, in such a manner that they may be moved toward each other along an arc. Such a retraction unit, replacing the conventionally employed retraction spring, always moves the damper flap element to a secure end position.

The first magnet element of the first counter movement unit, may be a holding magnet element positioned at a magnet holding peg in the damper flap housing element. The second magnet element of the counter movement unit, may be a moving magnet located on at a magnet support arm of a sprocket unit that is connected to the damper flap shaft element.

The holding and the moving magnet elements can move in one or two planes. The spring characteristic and the spring force can be influenced in this manner.

The counter movement unit can exhibit a third magnet element that can be arranged at the moving magnet element with an opposite magnetic pole, which acts as an amplification magnet element.

In the spring travel path, the holding magnet element and the moving magnet element can be located with their south poles opposite to one another. However, it is also possible that their north poles are located opposite to one another. The counter spring movement along the spring travel path can essentially be rising linearly.

The amplification magnet element can be arranged with its south pole at the north pole, or with its north pole at the south pole, of the moving magnet element. These measures ensure that during a movement of the moving magnet element to the holding magnet element, a magnetic force is established in opposition to this movement, where said magnetic force has the same retracting effect as a spring force.

The moving magnet element and the amplification magnet element can be molded, at least partially, into the magnet support arm. The magnet support arm and an adjacent sprocket segment of the sprocket unit may consist, at least partially, of synthetic material. This allows for accurate positioning and easy embedding of the two magnet elements in the magnetic support arm.

A second counter movement unit may be designed such that at least two additional magnet elements with the same magnetic polarity are arranged at least partially offset above one another and slideable in relation to one another. This retraction unit replaces the limp home spring, enabling an emergency operation of the air flap system in case the motor drive unit malfunctions. In addition, this construction avoids the possibility of the damper flap element freezing in one position.

A standing magnet element can be attached within a magnet housing unit, that is supported by an additional support plate, the standing magnet element being the first magnet element of the second counter movement unit.

A slide magnet element, positioned offset to, and above, the standing magnet element is a second magnet element of the counter movement unit, and is moveable into the magnet housing element using a stop arm of an additional sprocket unit that may be connected to the damper flap shaft element.

A repelling magnet element can be located in the stop arm. This increases the spring force.

The sliding magnet element and the standing magnet element can be separated into a north pole and a south pole (N, S) located opposite to it; exhibit a disc-shaped north pole around which at least one south pole is located; or exhibit a disc-shaped north pole with a disc-shaped south pole opposite to it.

The holding magnet element, the moving magnet element, the shaft magnet element and the standing magnet element, the first, second and third sliding magnet element and the first, second and third standing magnet element can have a cross-section that is square, rectangular, triangular, quadrangular, multi-angular, oval, round, elliptic or the like. The motion characteristic of this magnet structure can be influenced in this manner.

The first, second and third sliding magnet element may be burred at opposite sides. In this manner, the sliding magnet element can be moved in a torsion-proof manner.

The moving holding magnet element, the moving element, the shaft magnet element and the standing magnet element can be permanent magnets. Known magnetic materials may be used as the magnet materials if the present invention.

Thus, it is a principal objective to advance an air flap supply device of the type mentioned above such that its damper flap element can be adjusted easily and securely.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
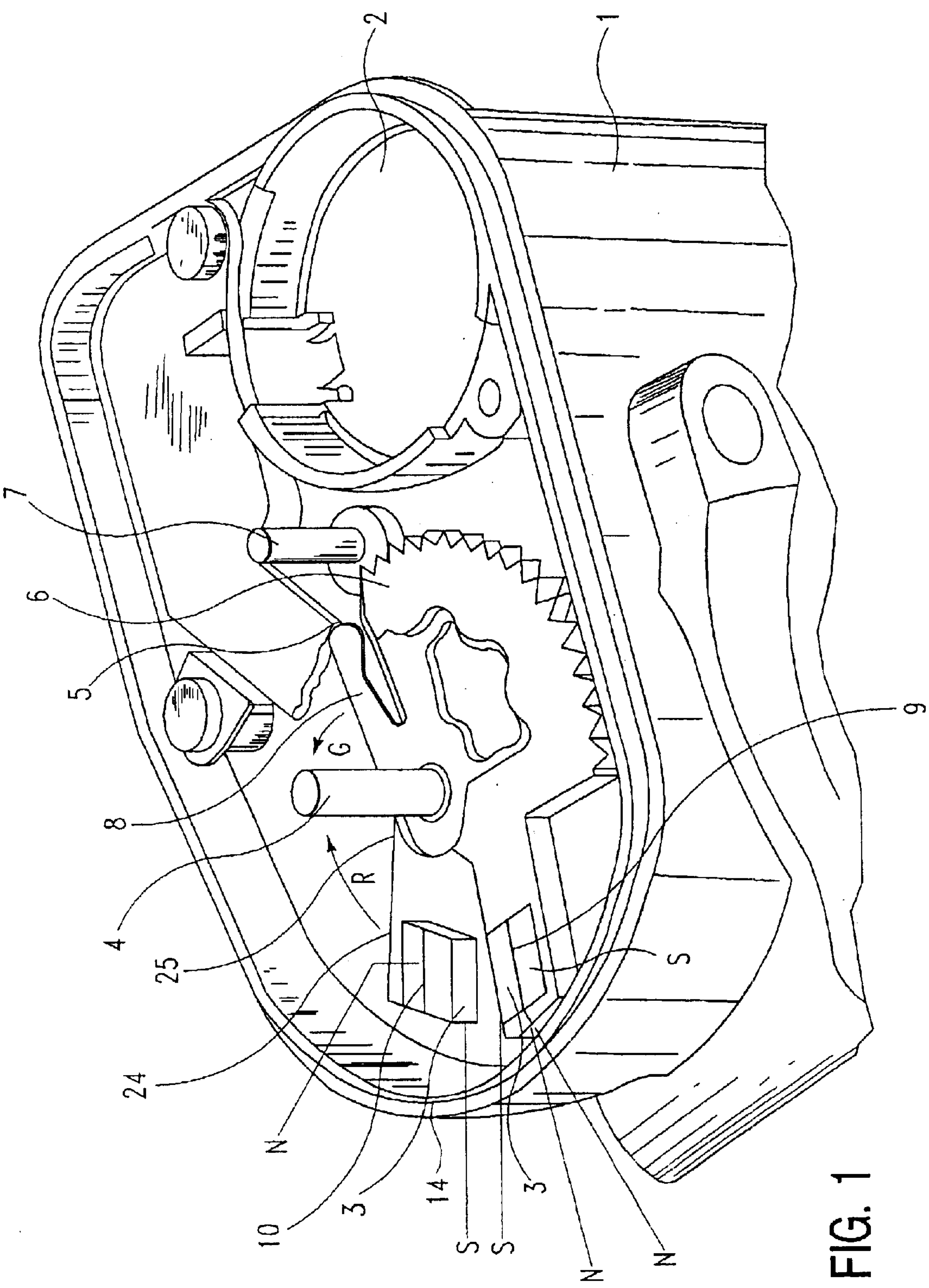
FIG. 1 is a schematic, perspective presentation of an air flap system with a counter movement unit as magnet positioning spring.

The preferred embodiments of the present invention will now be described with reference to FIGS. 1–8 of the drawings. Identical elements in the various figures are designated with the same reference numerals.

Figure 2:
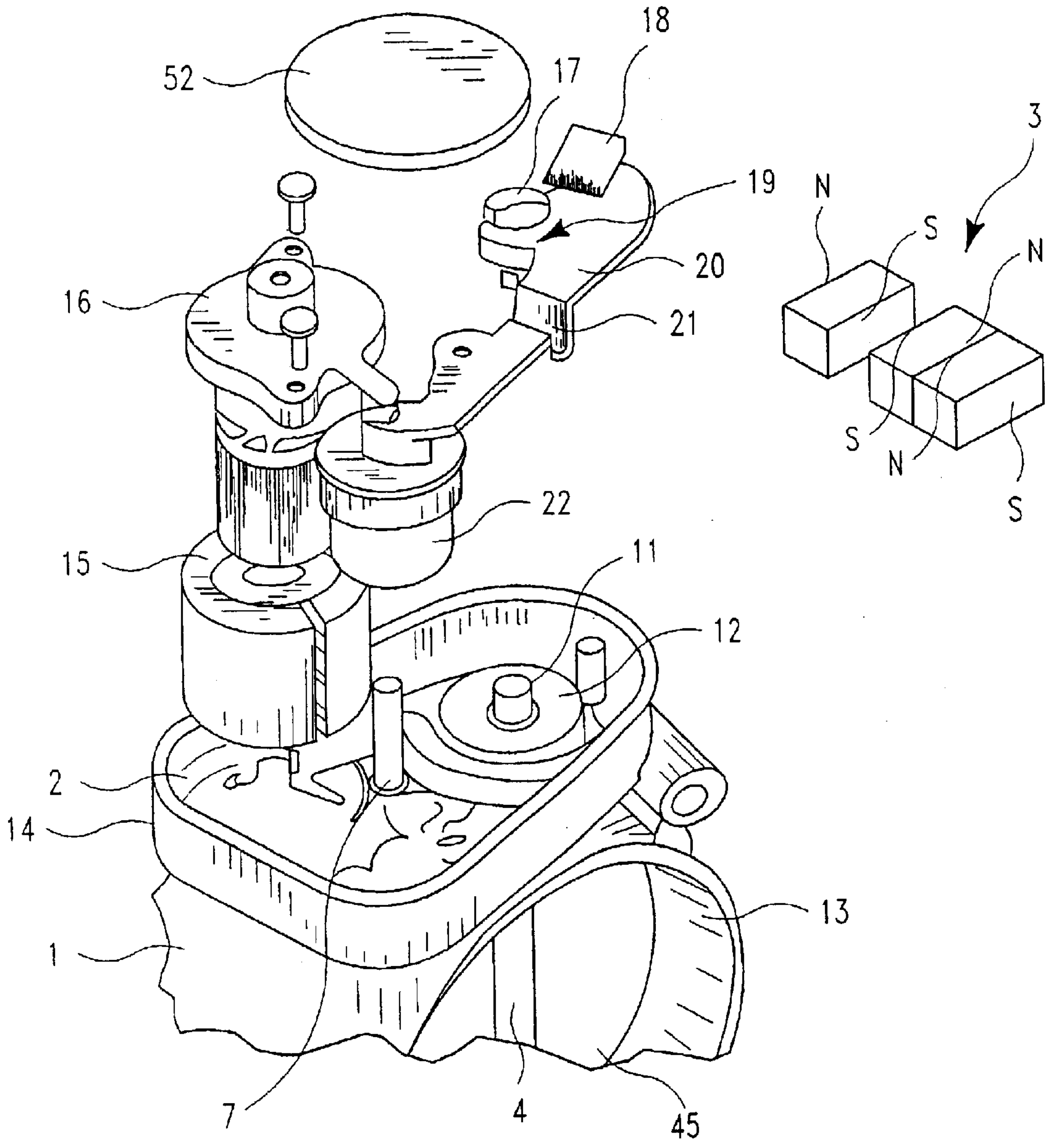
FIG. 2 is a partially exploded top view of an air flap system according to FIG. 1.
Figure 3:
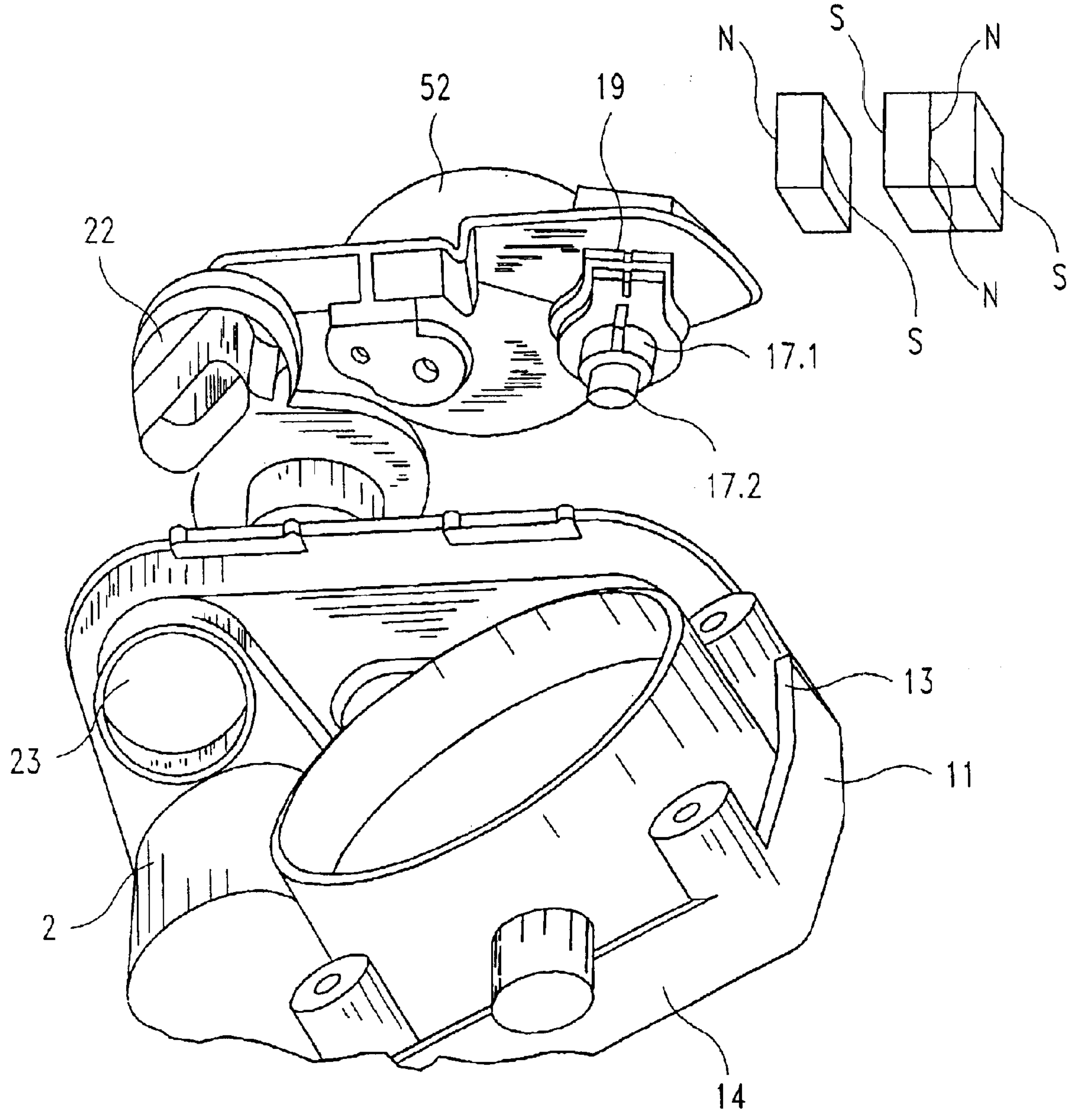
FIG. 3 is a partially exploded bottom side view of an air flap system according to FIG. 1.
Figure 4:
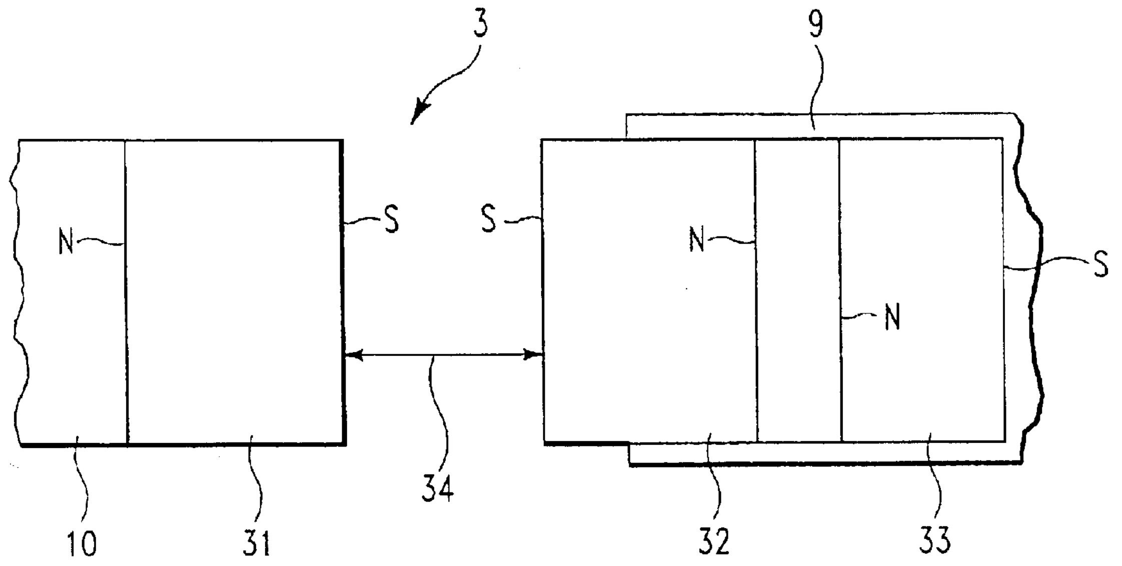
FIG. 4 is a schematic partial top view of a counter movement unit as a magnet positioning spring for an air flap system according to FIGS. 1 to 3.

FIGS. 1 to 3 show an air flap system device. It consists of a damper flap housing element 1 with a drive housing 14 attached to it. Attached in the damper flap housing element 1 is a motor housing element 2.

A damper flap element 45 is adjustably positioned in the damper flap housing element 1 in a damper flap opening 13 with a damper flap shaft element 4. The damper flap shaft element 4 protrudes into the drive housing 14.

As is shown particularly in FIGS. 2 and 3, a motor unit 15 is positioned in the motor housing element 2, and is connected to the shaft element 4. A motor support unit 16 is located above the motor unit 15. It is, at least partially, connected to a connecting unit 20 that has an integrated expansion loop 21.

A plug-connector unit 22 that can be fitted within a plug connector opening 23 in the damper flap housing element 1 is arranged at one end of the connection unit 20.

A Hall effect sensor element 19 that consists of a partial stator element 17 with two partial stator elements 17.1, 17.2 located opposite to one another and an IC element is positioned at the opposite end of the connection unit 20. A magnet element of the sensor 19 is molded to a damper flap shaft element 4.

The force of the motor unit 15 acting upon the shaft element is transferred using a gear. Shown from this gear are a cogwheel element 52, a gear peg 7 and a sprocket unit 6, 8.

Located hidden underneath a rotary plate 11 is a retraction spring element 25. If the damper flap shaft element is moved by the motor unit 15 and thus the damper flap element 45 opened, the retraction spring element 25 ensures that the damper flap shaft element and thus the damper flap element 45 is always moved to a defined end position (idle position).

It is significant for the invention that the damper flap element is retained at a certain end position (limp home position) using this sprocket unit and due to a counter movement unit 3. While through a retraction movement R the damper flap shaft element 4 is retracted to an end position (idle position) using the retraction spring element 25, through a counter spring movement G the damper flap element is held open at an opening angle at the other end position using the counter movement unit 3. In fact, the end of a segment of the sprocket unit 6 presses against a stop peg 5 that is supported by a support plate 24.

This is accomplished by a holding magnet element 31 with a north and a south pole; N, S, attached to a magnet support peg 10 that is positioned on a support plate 24 such that it points into a free space with its south pole S. A moving magnet element 32 is held on the magnet support arm 9 of the sprocket unit, such that its south pole S is located opposite to the south pole S of the holding magnet 31. The moving magnet element 32 is held in a sliding manner in a pocket of the magnet support arm 9. The north pole N of the moving magnet element 32 is located opposite of a north pole N of an amplification magnet element 33 with a north and south pole N, S, such that a counter force F1 is generated. Both magnet elements 32, 33 are molded into the magnet support arm 9, which is made, at least partially, of a synthetic material.

The holding magnet element 31 is located opposite the magnet elements 32, 33 in one or two planes.

If the motor unit 15 malfunctions, the damper flap element 45 can be moved by the counter spring movement G from the stop peg 5, with the adjacent end of the segment of the sprocket unit 6 so far until the end of the stop arm 8 contacts the stop peg 5. The magnet element 32 on the one side and the magnet elements 32, 33 on the other side, from which the magnet element 33 amplifies the magnet force of the magnet element 32 and in particular the counter force F1, travel a spring travel path 34.

Figure 8:
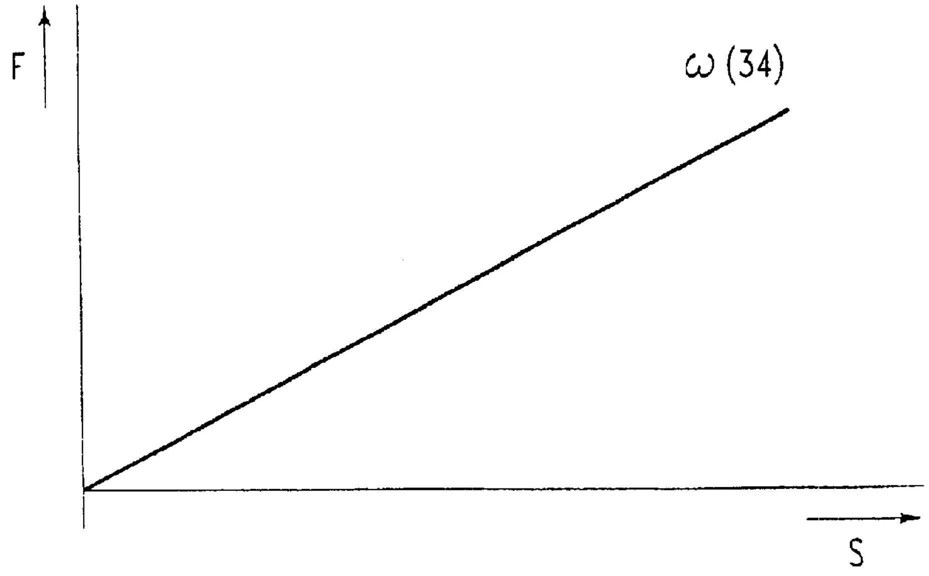
FIG. 8 shows the spring travel path of a counter movement unit according to FIGS. 1 to 4 and FIGS. 5 to 6 or 7 as a function of a spring force corresponding to the path.

Through a special design of the magnet elements, the spring force can be linearized in relation to the spring travel path 34, which is exponential for cube-shaped magnet elements, as shown in FIG. 8. This allows for a precise and fine adjustment of the damper flap element, such that an emergency operation of the vehicle with a reduced speed is possible. It is of particular advantage that contrary to springs, the magnet elements operate wear-free and without breakage, such that the air flap system functions without problems in the limp home operation.

Figure 5:
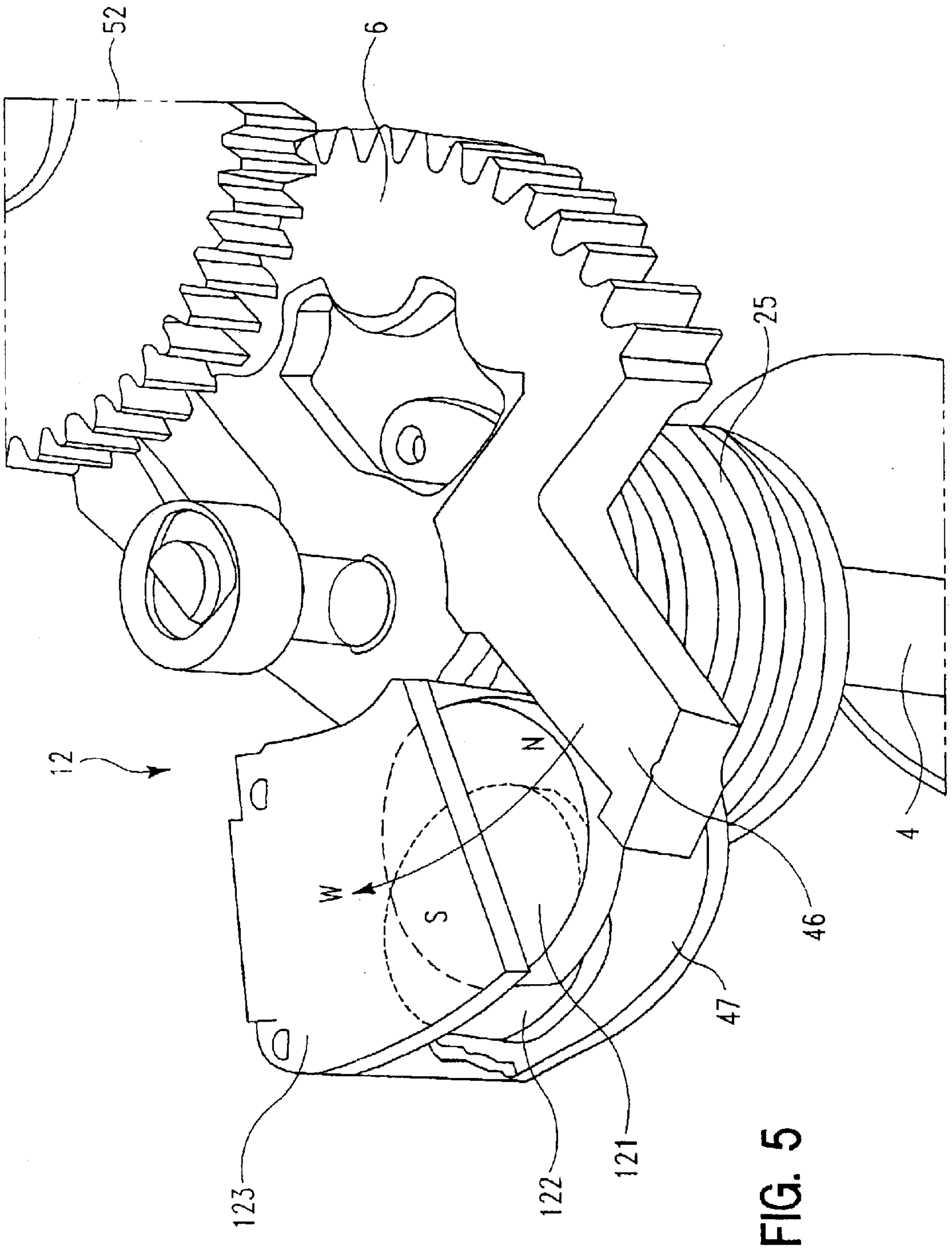
FIG. 5 is a schematic, perspective partial presentation of an air flap system in an additional embodiment of a counter movement unit.
Figure 6:
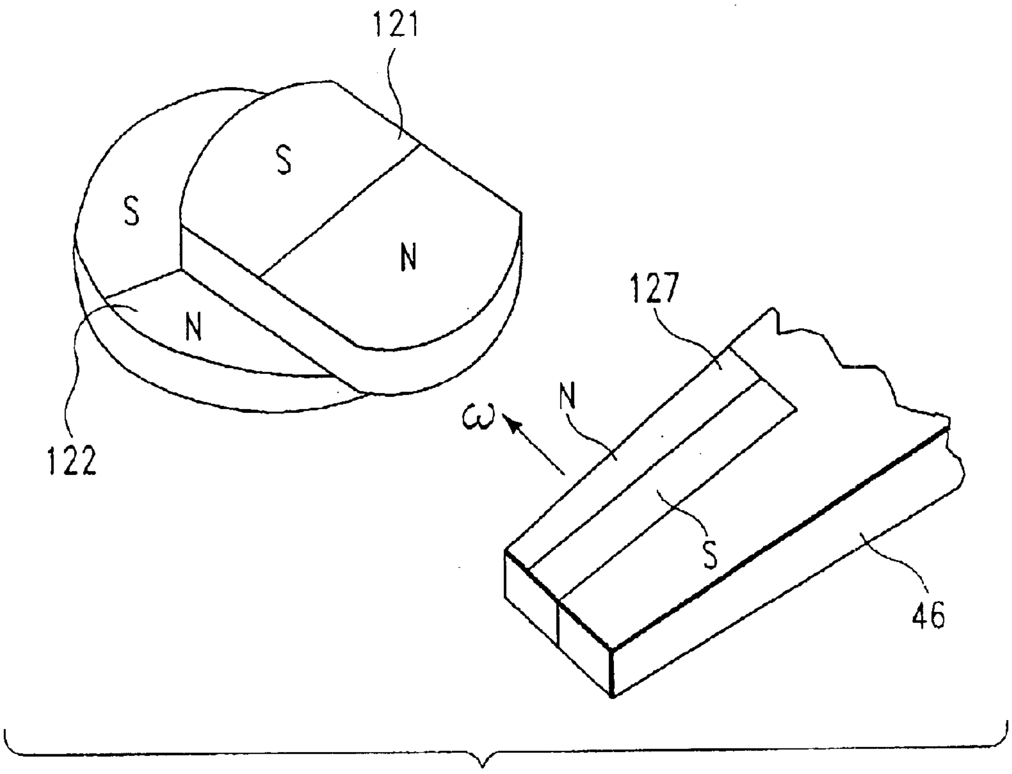
FIG. 6 is a schematic, perspective partial presentation of a first embodiment of a magnet system for a counter movement unit according to FIG. 5.

Another embodiment of a counter movement unit 12 is shown in FIGS. 5 to 7. It consists of a sliding magnet element 121 and located underneath it a standing magnet element 122, which is located in a magnet housing element 123. The magnet housing element 123 is supported by a support plate 47. A stop peg protrudes opposite the magnet housing element 123. The support plate is connected to the shaft element 4.

The sliding magnet element 121 includes, as is shown particularly in FIG. 6, on the one side a magnetic south pole S and on the opposite side a magnetic north pole N. Located opposite the sliding magnet element 121 and at least partially underneath it is a standing magnet element 122. Here, the north pole N is positioned opposite the south pole S of the sliding magnet element.

It is significant for the invention that the two magnet elements 121, 122 exhibit essentially a circular shape. The sliding magnet element is flattened on both sides so that it can slide in a straight line. The movement (spring travel) of the magnet elements in relation to one another can be influenced due to the fact that the sliding magnet element and the standing magnet element 122 are arranged offset and at a certain distance to one another. In addition, a repelling magnet element 127 may be located on a stop arm 46 that is located at the sprocket segment 6.

FIG. 8 shows a spring travel path ù of the magnet elements 121, 122, 127 in a coordinates system as a force F as a function of a travel path S. As FIG. 8 shows, the spring travel path ù is a straight line that is particularly determined by the design of the two magnet elements 121, 122 as described based on FIGS. 4, 6, 7*a* and 7*b*.

If the motor unit 15 malfunctions, the damper flap element 45 can be moved by the counter spring movement from the stop peg until the end of the stop arm contacts the stop peg. The magnet element 121 on the one side and the magnet element 122 on the other side, whereby the magnet element 127 amplifies the force, travel a spring travel path ù.

Through the special design of the magnet elements, the spring travel path has been linearized as has already been described. This allows for a precise and fine positioning of the damper flap element, such that an emergency operation of the vehicle with a reduced speed is possible. It is of particular advantage that contrary to springs, the magnet elements operate wear-free and without breakage, such that the air flap system functions without problems in the limp home operation.

Figure 7A:
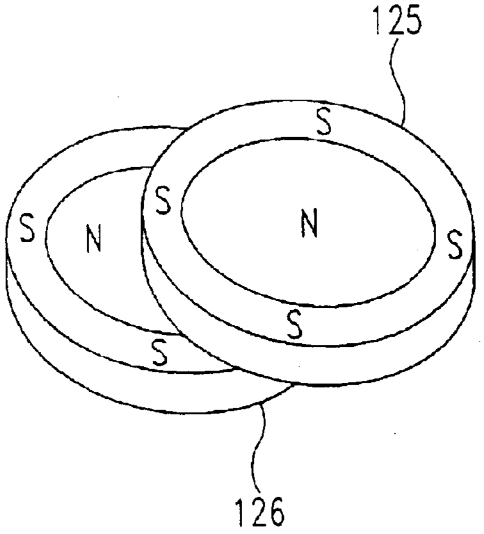
FIG. 7*a* is a schematic, perspective partial presentation of a second embodiment of a magnet system for a counter movement unit according to FIG. 5.

In FIG. 7*a*), the magnet elements are designed similar to a Two-Euro piece. Both a sliding and a standing magnet element 125, 126 exhibit a circular core as a north pole N around which a ring with at least one south pole S is located. Both magnet elements 125, 126 are located offset above one another, such that the spring effect is generated as described.

Figure 7B:
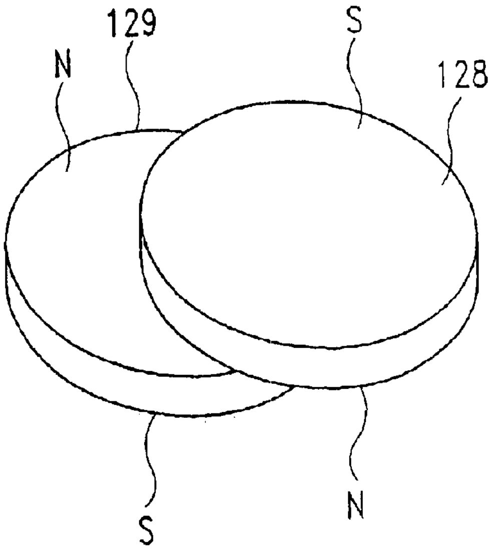
FIG. 7*b* is a schematic, perspective partial presentation of a third embodiment of a magnet system for a counter movement unit according to FIG. 5.

In FIG. 7*b*), the magnet elements are designed similar to a 50-cent piece. Both a sliding and a standing magnet element 128, 129 exhibit a circular core with a north pole N on the one side and a south pole S on the other side. Here too, the two magnet elements 128, 129 are located offset above one another, such that the spring effect is generated as described.

There has thus been shown and described a novel air flap system with magnetic positioning device which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An air flap supply device for the controlled supply of burner air to a combustion engine, comprising a damper flap element within a damper flap opening in a damper flap housing element, said damper flap element connected to a damper flap shaft element which is biased toward an idling direction (R) and adjustable by a positioning movement (G) produced by at least One retraction unit, the improvement wherein the retraction unit comprises a magnetically homopolar counter movement unit comprising at least two magnet elements, a holding magnet element and a moving magnet element, with the same magnetic polarity (N, S) positioned opposite to one another, said moving magnet element moveable with respect to the holding magnet element.

2. A device as set forth in claim 1, wherein a first counter movement unit comprises at least two magnet elements with the same magnetic polarity (N, S), located opposite to one another, and mov able in an arc toward one another.

3. A device as set forth in claim 1, wherein the retraction unit comprises a magnet holding magnet element, attached to a magnet support peg, attached to a support plate, and a second moving magnet element attached to a magnet support arm of a sprocket unit that is connected to the damper flap shaft element.

4. A device as set forth in claim 1, wherein the holding magnet element and the moving magnet element move in one movement plane.

5. A device as set forth in claim 1, wherein the holding magnet element and the moving magnet element move in separate movement planes.

6. A device as set forth in claim 3, wherein the moving magnet element is arranged in a sliding fashion in a pocket in the magnet support arm.

7. A device as set forth in claim 3, wherein the counter movement unit further comprises an amplification magnet element that is arranged with an opposite magnetic pole opposite to the moving magnetic element.

8. A device as sot forth in claim 3, wherein the holding magnet element and the moving magnet element are positioned with their south poles located opposite to one another in a travel path.

9. A device as set forth in claim 7, wherein the amplification magnet element is arranged with its north pole facing the north pole of the moving magnet element.

10. A device as set forth in claim 3, wherein the holding magnet element and the moving magnet element are positioned with their north poles located opposite to one another, in a travel path.

11. A device as set forth in claim 7, wherein the amplification magnet element is arranged with its south pole (H) facing the south pole of the moving magnet element.

12. A device as set forth in claim 7, wherein the moving magnet element and the amplification magnet element are at least partially molded into the magnet support arm.

13. A device as set forth in claim 3, wherein the magnet support arm and a segment of the sprocket unit are made at least partially of a synthetic material.

14. A device as set forth in claim 1, wherein a second counter movement unit comprises at least two additional magnet elements with the same magnetic polarity (N, S), slideably arranged with respect to each other, and at least partially offset above one another.

15. A device as set forth in claim 14, wherein a first magnet element of the second counter movement unit is a standing magnet element attached to a magnet housing element, supported by an additional support plate, and wherein a second magnet element of the second counter movement unit is a sliding magnet element, slideably arranged with respect to, and offset above, the standing magnet element attached to the magnet housing element, and the sliding magnetic element is moved into the magnet housing element using a stop arm of an additional sprocket unit that is connected to the damper flap shaft element.

16. A device as set forth in claim 15, wherein a repelling magnet element is Located on the stop arm.

17. A device as set forth in claim 15, wherein the sliding magnet element and the standing magnet element are each separated into a north pole and a south pole, with the north pole of one located opposite the south pole of the other.

18. A device as Bet forth an claim 15, further comprising a second sliding magnet element and a second standing magnet element which exhibit a disc-shaped north pole (N) around which at least one south pole (N, S) is located.

19. A device as set forth in claim 18, further comprising a third sliding magnet element and a third standing magnet element which exhibit a disc-shaped north pole (N) that is located opposite to a disc-shaped south pole (S).

20. A device as set forth in claim 1, wherein the holding magnet element and the moving magnet element, each have a cross-section that is selected from the following shapes: square, rectangular, triangular, quadrangular, oval, round and elliptical.

21. A device as Bet forth in claim 19, wherein the first, second and third sliding magnet element each exhibit two flattened portions located opposite to one another.

* * * * *